No. 728,071. PATENTED MAY 12, 1903.
J. W. ALEXANDER.
ATTACHMENT FOR AIR BRAKE SYSTEMS.
APPLICATION FILED NOV. 22, 1902.
NO MODEL.
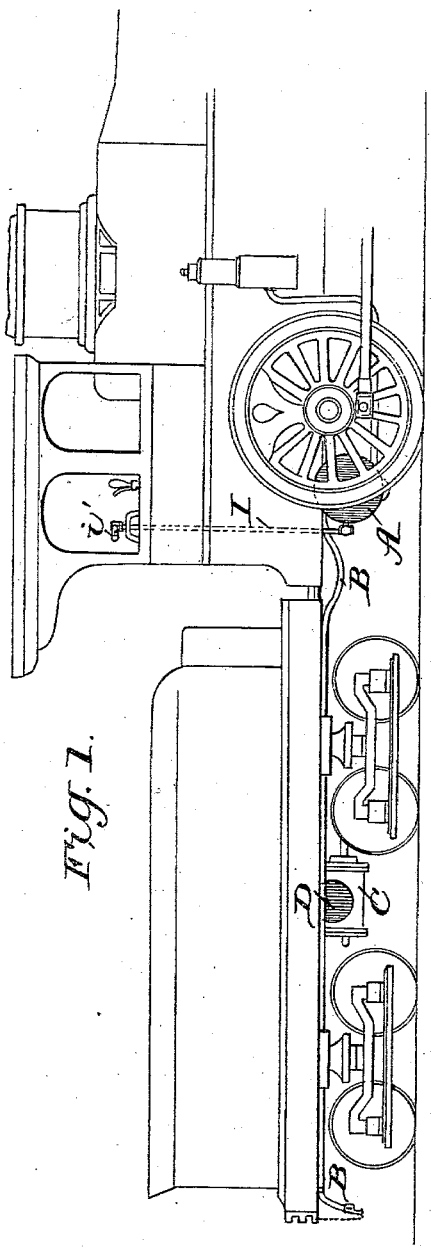
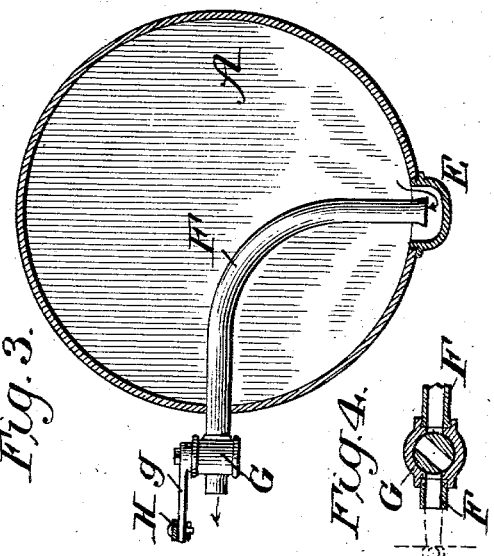
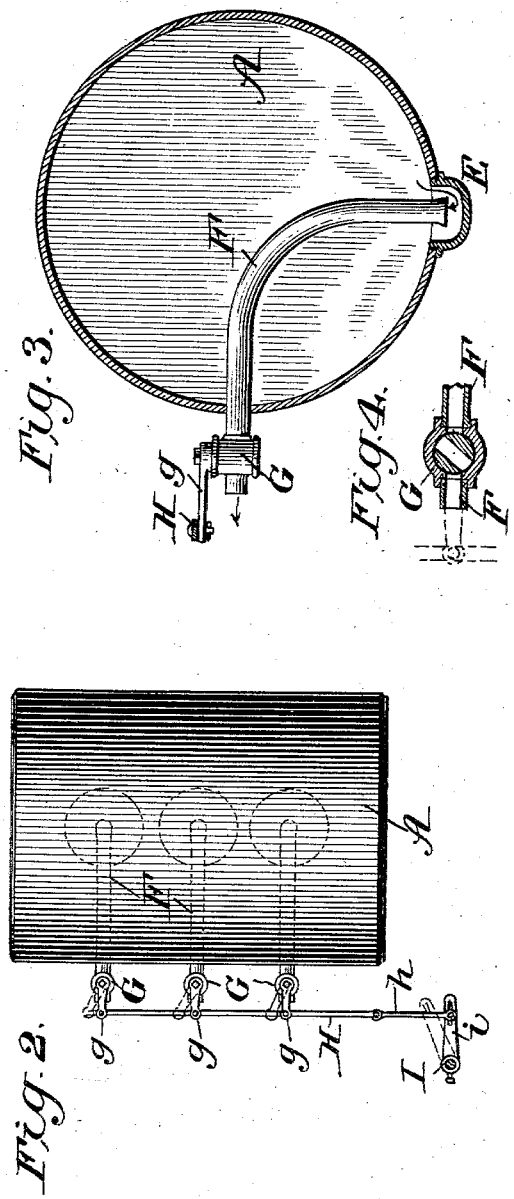
WITNESSES:
Jos. A. Ryan
Amos W Hart
INVENTOR
James W. Alexander.
BY Munn & Co
ATTORNEYS.

No. 728,071. Patented May 12, 1903.

UNITED STATES PATENT OFFICE.

JAMES W. ALEXANDER, OF BRIDGEPORT, OHIO.

ATTACHMENT FOR AIR-BRAKE SYSTEMS.

SPECIFICATION forming part of Letters Patent No. 728,071, dated May 12, 1903.

Application filed November 22, 1902. Serial No. 132,399. (No model.)

*To all whom it may concern:*

Be it known that I, JAMES W. ALEXANDER, a citizen of the United States, and a resident of Bridgeport, in the county of Belmont and State of Ohio, have made certain new and useful Improvements in Attachments for Air-Brake Systems, of which the following is a specification.

In air-brakes of the Westinghouse and allied types the main drum or storage-reservoir carried on the locomotive performs two distinct functions. First, it acts as a storage-reservoir for air to be used in releasing brakes or charging the train, and, second, as a drain-cup for freeing air from water. Water tends to accumulate in such drum or reservoir from the fact that all air contains moisture in suspension and also from leakage. The reservoir requires to be of great capacity, the larger the better, and in order that its capacity may be kept at the maximum great care is required to insure its complete drainage, and this should be done at frequent intervals, since if water accumulates to an undue extent in the reservoir the efficiency of the brake is impaired in a corresponding degree.

It is the object of my invention to provide such drum or reservoir with a blow-off attachment which may be operated from the locomotive-cab and which subserves two purposes—first, to remove the water accumulating in the drum, and, second, to suddenly relieve air-pressure in the train-pipe as required for an emergency-brake.

The details of construction, arrangement, and combinations of parts are as hereinafter described, reference being had to accompanying drawings, in which—

Figure 1 is a side view representing my invention applied to a locomotive and tender. Fig. 2 is a plan view of the main drum or reservoir provided with my attachment. Fig. 3 is an enlarged vertical transverse section of the reservoir, and Fig. 4 is a horizontal section of the valve forming part of the attachment.

In Fig. 1, A indicates the main drum or reservoir; B, the train-pipe; C, the auxiliary reservoir, and D the brake-cylinder. In practice the train-pipe may end at and connect directly with the engineer's valve, as usual in the Westinghouse system. As shown best in Fig. 3, the drum A is provided on its lower side with an opening which is closed by a cup E, the latter being screwed in place and projecting below the reservoir. A pipe F is arranged in the drum with its lower end inserted in the cup E and its upper end extending out through the side of the reservoir, where it is provided with a valve G. (See Fig. 4.)

In practice I propose to employ any number of these attachments, preferably three, as represented in Fig. 2.

Each of the valves G is provided with a lever-arm g, and the several lever-arms are connected by a rod H, (see Fig. 2,) which is flexibly connected by a link h with the slotted lever-arm i of a vertical rod I, that extends up into the locomotive-cab and is there provided with a short handle i'. (See Fig. 1.) The valve or stop-cock G is shown in Fig. 4 in normal position—that is to say, closing the exit of the train-pipe F. It is apparent that by rotating the vertical rod I a fraction of a revolution the connecting-rod H will throw all the valves to the open position—that is to say, into the position required for drainage. It will be further understood that the engineer's brake-valve is to be set on the lap or turned in order to close communication with the train-pipe whenever it is desired to blow off water from the reservoir 3. Thus the pressure in the auxiliary reservoirs throughout the train is not lessened at such time, and since but a small quantity of air is drawn up from the main reservoir in the drainage operation the normal pressure within the reservoir is quickly restored by the air-pump.

It will be seen that the cup E practically extends the bottom of the reservoir A to a lower point and that it serves to receive and hold water, which would otherwise fill to a greater or less extent the reservoir proper. Further, the cup insures the passage or discharge of all the water that accumulates in the reservoir, which would not be practicable if the pipes F terminated within the reservoir proper a short distance above the bottom of the same. The drainage of the reservoir A being thus easy to effect, the engineer will frequently resort to its use, and thus the reservoir will be kept practically free of water at all times, and the capacity of the reservoir, and therefore the efficiency of the brake, will be correspondingly maintained or increased.

Having thus described my invention, what I claim as new, and desire to secure by Letters Patent, is—

1. In an air-brake system of the class described, the combination with the main reservoir, of an open-end air-discharge pipe, a valve for controlling the discharge therefrom, and means for operating such valve, substantially as shown and described.

2. In an air-brake system of the class described, the combination with the main reservoir, of an open-end air-discharge pipe whose inner end leads downward into proximity to the bottom thereof, and which extends out through the drum, a valve applied to the outer end of the pipe and normally closing the same, and means under the control of the engineer for setting said valve in the open or closed position, substantially as shown and described.

3. The combination, with the main reservoir, and a cup or concave water-receptacle applied to the bottom of same, of an open-end drainage-pipe within the reservoir whose lower end enters the said cup and whose other end projects from the said drum, a valve arranged in the outer end of the pipe, and means for controlling the position of the valve as required for opening or closing the drainage-pipe, substantially as shown and described.

4. The combination, with the main reservoir, of an open-end drainage-pipe arranged therein, and extending through the side of the reservoir, a valve applied to its outer end and provided with a lever-arm, a rod extending into the locomotive-cab, and a rod connecting the same with the valve-arm, substantially as shown and described.

5. The combination, with the main reservoir, having cups applied to its under side, of a series of open-end drainage-pipes whose inner ends enter the said cups, valves applied to the outer ends of the pipes and provided with lever-arms, a rod which pivotally connects the series of valve-arms, a vertical rotatable rod extending into the locomotive-cab and provided at each end with a lever-arm, the lower arm being flexibly connected with the valve-rod, whereby the several valves may be operated simultaneously for relieving the reservoir, in the manner described.

JAMES W. ALEXANDER.

Witnesses:
JOSEPH C. HEINLEIN,
CHAS. S. RAYMER.